Jan. 31, 1961
A. J. DE MATTEO
2,969,874
EXTRUSION TOOLS FOR NON-CIRCULAR SECTIONS
Filed Oct. 26, 1956
2 Sheets-Sheet 1
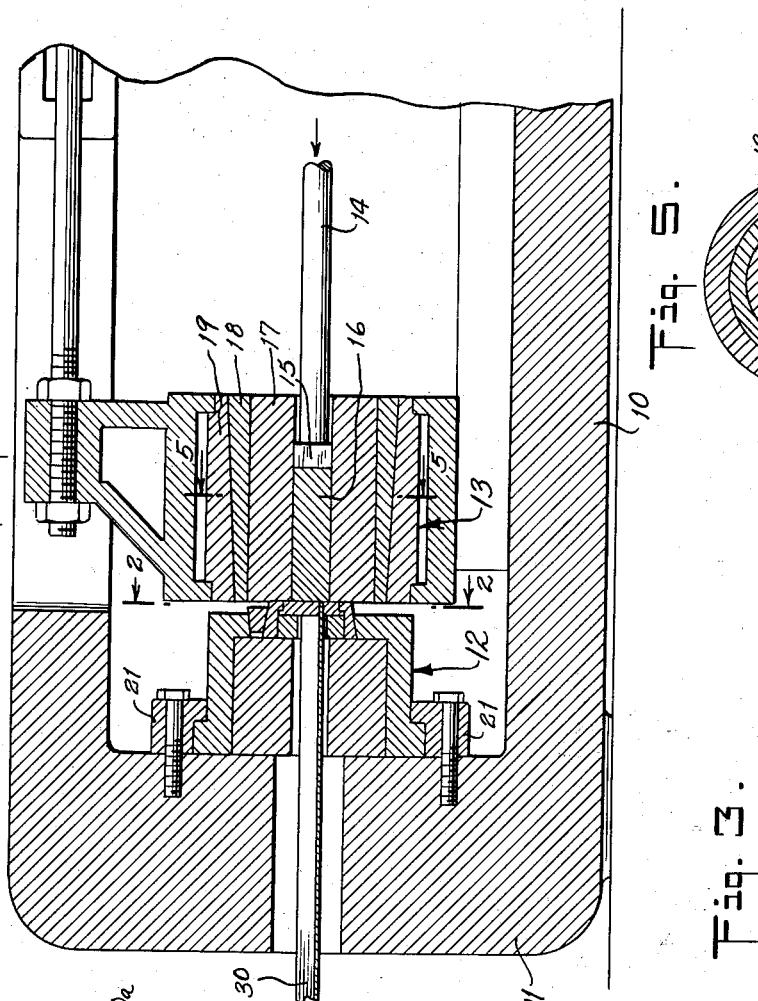
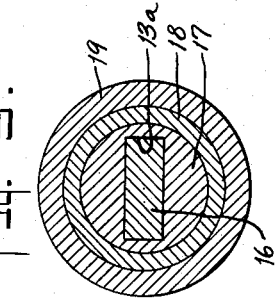
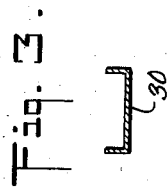
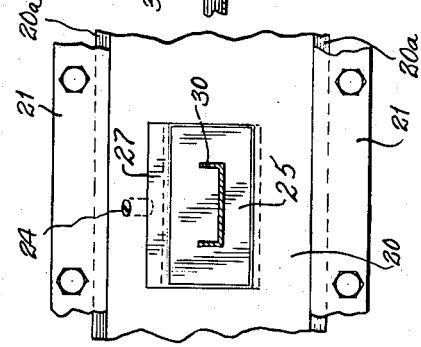
INVENTOR.
ADOLPH J. DEMATTEO
BY
Kenyon & Kenyon
ATTORNEYS

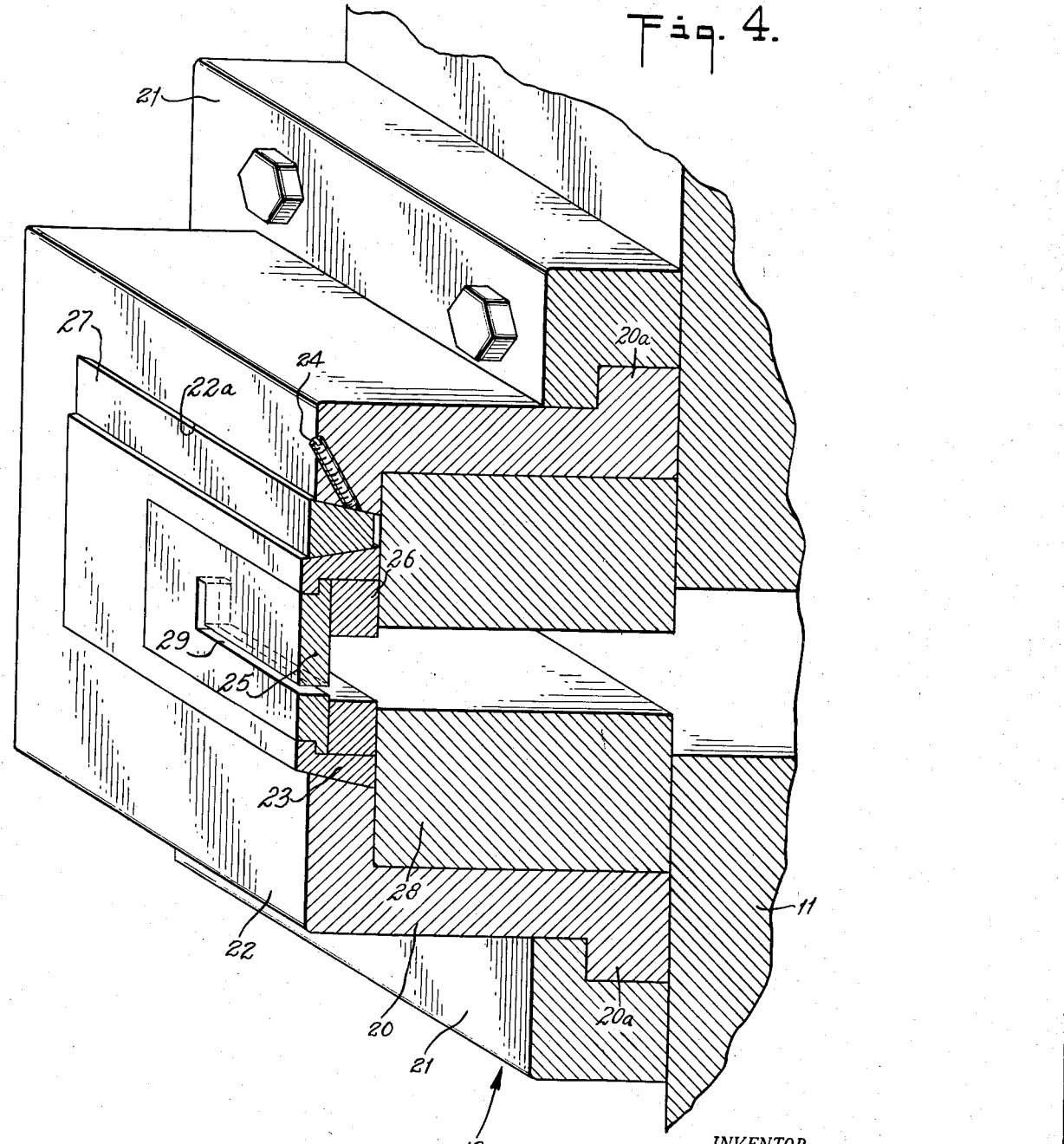

United States Patent Office 2,969,874
Patented Jan. 31, 1961

2,969,874
EXTRUSION TOOLS FOR NON-CIRCULAR SECTIONS

Adolph J. De Matteo, Berkeley Heights, N.J., assignor to Farrel-Birmingham Company, Inc., Ansonia, Conn., a corporation of Connecticut Filed Oct. 26, 1956, Ser. No. 618,567

1 Claim. (Cl. 207—17)

The present invention relates generally to extrusion presses, and more particularly to extrusion tools adapted to fabricate non-circular sections.

Basically, the extrusion process is one by which a billet of solid metal is converted in a press into a continuous length of uniform cross-section. This is effected by forcing the metal to flow under high pressure through a die opening which is so shaped as to impart the desired profile to the product. Certain of the press components, such as the dies, pressure dummies and containers constitute the really essential tools in the extrusion process. These tools work under very strenuous conditions and must sustain the combined effects of thermal and mechanical stresses. Some of the heaviest duty is imposed on the die and it is this tool which is subject to the greatest alteration in use. The die itself ordinarily takes the form of a comparatively thin disc or plate fitting accurately into a recess in the face of a die holder or ring which in turn is supported by a bolster.

In extrusion presses of standard design for the formation of products having a circular profile, the container has a circular bore for accommodating a cylindrical billet, the billet being driven by a ram toward a die having a circular orifice of the desired dimension. The die is supported in a circular ring set in a locking bar or slide which is buttressed against a plate in the head of the press, and in order to change the die the slide is moved transversely. The slide in the conventional arrangement acts chiefly as a carrier for the ring, the brunt of the applied pressure being borne by the ring.

Where the product to be wrought is of a non-circular cross section, such as an angle profile, it has heretofore been the practice to make use of the same basic extrusion tool arrangement as with circular profiles. Thus the die containing the angle shaped orifice is still held within a circular ring operating in conjunction with a container having a circular bore for the insertion of a cylindrical billet.

Experience has shown that the circular die holding ring and the correspondingly shaped container and billet, while generally suitable for circular sections, have certain serious drawbacks when employed for the formation of non-circular sections. For example, let us assume that it is desired to extrude a channel member having a relatively wide bottom wall and very short sides perpendicular thereto. With a conventional die arrangement it would be necessary to provide a circular ring whose diameter exceeded the width of the bottom wall. A ring so dimensioned would be quite sizeable and in many instances greater than the existing confines of a standard press.

In view of the foregoing, it is the principal object of the present invention to provide extrusion press tools especially adapted for the formation of non-circular shapes, and dimensioned so as to operate within the confines of standard presses.

More particularly it is an object of the invention to provide a die and ring arrangement which is so mounted on a carrier or slide whereby the slide bears a substantial portion of the pressure applied to the die. A significant feature of the invention resides in the fact that the die holder arrangement makes possible the deflection of stress in the direction of the carrier.

Also an object of the invention is to provide tools for extrusion presses which are of mechanically efficient and economic design and which are particularly suitable for the formation of products having a rectangular configuration.

For a fuller understanding of the invention as well as other objects and features thereof reference may be had to the following detailed description to be read in conjunction with the accompanying drawings, wherein:

Fig. 1 is a longitudinal sectional view of a preferred embodiment of a horizontal extrusion press in accordance with the invention.

Fig. 2 is a front view of the die holder, seen in the direction of extrusion.

Fig. 3 is a transverse sectional view of the extruded product.

Fig. 4 is an enlarged perspective view, partly in section, of the die assembly in accordance with the invention.

Fig. 5 is a view of the billet container seen in the direction of extrusion.

Referring now to the drawings and more particularly to Fig. 1, an extrusion press in accordance with the invention comprises a yoke frame 10, the front end of which acts as an abutment or platen 11. Rigidly supported against front platen 11 is a die assembly, generally designated by numeral 12. Movably supported between the horizontal arms of the frame is a container, generally designated by numeral 13, having a bore into which is insertable an hydraulically-operated ram 14. In front of the ram 14 is placed a pressure disc or dummy 15 which fits the container more closely than the ram to prevent rearward extrusion of the metal. The hydraulic cylinder (not shown) for the ram is supported at the other end of the frame.

In operation, a solid block of preheated metal in the form of a billet 16 is placed within the container 13 and the ram 14, actuated hydraulically, exerts the necessary pressure to force the metal toward the die, thereby to flow through the die orifice to form continuous lengths of uniform cross section.

The press container 13 undergoes severe thermal stress by reason of the heat gradients set up by the hot billets, besides being subjected to the heavy internal pressure exerted by the ram during the extrusion stroke. To withstand such stresses the container includes an inner liner 17 of alloy steel and an outer wedge-shaped or tapered liner 18 made of a lower alloy nickel-chrome steel, the outer liner being surrounded by a cylindrical body 19.

As best seen in Fig. 4 the die assembly 12 is constituted by a rectangular die slide 20, having flanges 20a extending outwardly at the base which are slideable within gibs 21 firmly secured to the abutment 11. Supported within a rectangular slot 22a in the front wall 22 of slide 20 is a die holder or ring 23 of generally rectangular configuration, the transverse section of the holder being trapezoidal whereby the holder is wedge-shaped.

To maintain the die holder snugly within the slot 22a, a solid wedge member 27 is provided whose configuration is similar to that of the holder save that the taper of the wedge is opposed to that of the holder. Thus axial pressure applied by the ram in the direction of the die holder produces a perpendicular component of force in the direction of the slide, thereby deflecting force from the holder to the slide and substantially relieving stress in the holder. The wedge is held in place by suitable studs 24 which are insertable in bores formed in the slide 20, Seated within the die ring 23 is the extrusion die 25 which takes the form of a comparatively thin rectangular plate. It is to be understood that the die plate in the case of complex dies may be made in several parts. However, where the design involves high local stresses and for strenuous service in making standard sections the plate and holder therefor may be combined to make massive dies. Behind the die insert 25 in the holder is a backer element 26. The die holder 23, the die insert 25 and wedge 27 are supported within the slide 20 by a bolster 28, the underface of the bolster resting adjacent abutment 11.

By way of illustration, the orifice 29 in the die plate has been shown as having an angle form to extrude a channel member 30, as shown separately in Fig. 3. It will be noted that the width of the channel member is relatively large as compared to the height of the sides and that the die plate and the ring therefor is similarly proportioned. It will be appreciated that were conventional die and ring structures used for channel shapes, the dimensions of the die and ring would be controlled by the width of the channel member and would therefore involve a much greater area than with the arrangement disclosed herein.

It is also to be noted that, as shown in Fig. 5, the bore 13a in the liner of the container also has a rectangular cross section to receive a rectangular billet 16, designed to co-act with the rectangular face of the die, and that the dummy 15 is likewise of rectangular shape.

While there has been shown a preferred embodiment of my invention, various changes in the details and arrangement of parts may be made without departing from the spirit and scope of the invention as defined by the claim hereto appended.

What is claimed is:

An extrusion die assembly comprising: a hollow die slide having one face thereof adapted to slide along the face of a press platen and the face opposite to said one face of said die slide having a rectangular opening which latter joins the hollow cavity in said die slide, at least one side of said opening having a slope that flares out from said face opposite to said cavity; two gibs adapted to be secured to said platen along opposite sides of said die slide to thereby hold said die slide in sliding contact with said platen; a hollow bolster filling said cavity and having a channel aligned with said opening and a corresponding channel in said platen; a rectangular die holder fitting against three sides of said opening one of which is said side having a slope, said holder seating on said bolster; a backer element seated on said bolster and enclosed by said holder, said element having a channel therethrough which is aligned with that of said bolster; an extrusion die seated on said element with the die sides being enclosed by said holder, said die having its billet contacting face free of but adjacent and substantially flush with a corresponding face on said holder, said die having an orifice therethrough which is aligned with the channels through said element, said bolster, and said platen; a wedge member pressed between said die and the side of said opening not contacted by said bolster, said wedge holding said die in assembled position; at least one stud holding said wedge in place; whereby said die, die holder, and their enclosed or surrounded parts may be, as a unit, readily slid to different positions along said face of said platen and may be readily disassembled as the occasion arises.

References Cited in the file of this patent

UNITED STATES PATENTS

| | | |
|---|---|---|
| 421,666 | Carpenter | Feb. 18, 1890 |
| 506,216 | Edison | Oct. 10, 1893 |
| 629,610 | Robertson | July 25, 1899 |
| 1,037,213 | Derain | Sept. 3, 1912 |
| 1,199,080 | Jones | Sept. 26, 1916 |
| 1,317,238 | Summey | Sept. 30, 1919 |
| 2,388,558 | Loewy | Nov. 6, 1945 |
| 2,389,876 | Sequin | Nov. 27, 1945 |
| 2,728,453 | Thweatt et al. | Dec. 27, 1955 |
| 2,738,063 | Billen | Mar. 13, 1956 |
| 2,858,017 | Kent et al. | Oct. 28, 1958 |
| 2,867,321 | Swanson | Jan. 6, 1959 |
| 2,894,625 | Harris et al. | July 14, 1959 |

FOREIGN PATENTS

| | | |
|---|---|---|
| 376,132 | France | May 3, 1907 |
| 530,489 | Canada | Sept. 18, 1956 |